United States Patent Office
3,536,586
Patented Oct. 27, 1970

3,536,586
MICROBIOLOGICAL PROCESS FOR SIMULTANEOUSLY 1-DEHYDROGENATING AND 16-HYDROXYLATING A STEROID
Bong Kuk Lee, Old Bridge, Dewey D. Y. Ryu, North Brunswick, Richard W. Thoma, Somerville, and Patrick A. Diassi, Westfield, N.J., assignors to E. R. Squibb & Sons, Inc., New York, N.Y., a corporation of Delaware
No Drawing. Filed Jan. 25, 1968, Ser. No. 700,345
Int. Cl. C07c 167/14
U.S. Cl. 195—51                           3 Claims

ABSTRACT OF THE DISCLOSURE

This invention relates to a process for converting steroids by simultaneously adding an hydroxy group and dehydrogenating the 1,2-position in a mixed culture fermentation utilizing a species of Arthrobacter and an hydroxylating microorganism.

SUMMARY OF THE INVENTION

The invention of the application is a process for treating a steroid, which is saturated in the 1,2-position of the A-ring and has a replaceable hydrogen in the 11,16,17 or 21-position, simultaneously with a microorganism of the genus Arthrobacter and with one or more of a hydroxylating microorganism in a mixed culture fermentation so that in the same operation a double bond is introduced into the 1,2-position and a hydroxy group is introduced into one or more of the 11,16,17 or 21-positions. It has been found that the mixed culture enhances the results obtained in a fermentation with a dehydrogenator of the genus Arthrobacter.

Conversion of steroids is frequently effected by the action of microorganisms in a fermentation medium whereby functional groups are introduced into the steroid nucleus or other transformations take place. When several microbiological transformations have been utilized in the synthesis of steroids, particularly those involving different genera or species of organisms and involving various changes in the steroid structure, these have usually been proposed sequentially rather than simultaneously in the belief that competing reactions would render the action of the microorganism less specific and reduced the yield. It has now been found that when dehydrogenating with a bacterial microorganism (or the active enzymes) of the genus Arthrobacter and hydroxylating with a mold or molds dehydrogenation and hydroxylation occur efficiently in a simultaneous reaction by contacting the steroid to be dehydrogenated and hydroxylated in a medium containing both the dehydrogenating and hydroxylating organisms. In the process of our invention combinations of organism and substrate are chosen so that the net result, in terms of overall efficiency of conversion of one steroid to another of greater value, is more efficient than are comparable processes in which the cultures are used separately or sequentially.

Among the known and valuable steroids which may be synthesized by the process of the invention are prednisolone, triamcinolone, dexamethasone, their 6α-fluoro analogs as well as 6α-methylprednisolone and the like.

Thus, for example, when a soybean medium containing 9α-fluorohydrocortisone is simultaneously inoculated with the 1-dehydrogenator A. simplex and the 16α-hydroxylator S. roseochromogenes under conditions of incubation normally used for 16-hydroxylation, that substance is completely converted to triamcinolone in 72 hours. In this medium S. roseochromogenes in pure culture normally converts about 300 μg./ml. of 9α-fluorohydrocortisone to 9α-fluoro-16α - hydroxyhydrocortisone is about 96 hours. Alone, A. simplex under these conditions effects 1-dehydrogenation but also reduces the 20-keto group. In the combined, simultaneous fermentation process there is no evidence of 20-dihydro products or of free 9α-fluoro-16α-hydroxyhydrocortisone. Thus, not only are the desirable reactions enhanced by physiological interaction of the organisms, but undesirable reactions are suppressed. More exactly, the actinomycete appears to repress, or prevent induction of the 20-keto-reductase of A. simplex, and at the same time the 16α-hydroxylating activity of S. roseochromogenes is enhanced.

A different, but also advantageous type of interaction is observed when a cornsteep medium containing 16α-hydroxycortexolone - 16,17 - acetonide is inoculated with a fungus such as Curvularia lunata or Absidia coerulea and bacterial species A. simplex. In cornsteep medium, induction of the 1-dehydrogenating enzyme of A. simplex, when grown first in soybean meal medium, is repressed in pure culture. However, when A. coerulea or C. lunata is also present during the entire fermentation, induction of 1-dehydrogenase of A. simplex occurs, i.e, the repression is relieved or counteracted by the metabolic activity of the fungus.

Species of the genus Arthrobacter, in addition to A. simplex, which effect the introduction of a double bond into the 1,2-position of the A-ring of a steroid (1-dehydrogenators) include globiformis, pascens, oxydans, aurescens, ureafaciens, tumescens, citreus, and terregens.

Microorganisms which effect the introduction of an hydroxy group into a position of the steroid nucleus having a replaceable hydrogen atom include 16α-hydroxylating species of the genera Streptomyces, especially S. roseochromogenes, Didymella or Pestalotia; 11β - hydroxylating species of the genera Curvularia, especially C. lunata, Coniothyrium, especially, C. hellebori, Botrytis, Colletotrichum, especially C. phomoides, Cunninghamella, especially, C. blakesleeana, Rhodoseptoria, Pseudomonas or Pycnosporium; 11α and 11β-hydroxylating species of the genera Absidia, especially A. coerulea, Blakeslea, Choanephora, Circinella, Stachylidium, Thamnidium, especially, T. elegans, or Tieghemella; 11α-hydroxylating species of the genus Aspergillus, especially, A. ochraceus, Bacillus, especially, B. cereus, Beauveria dactylium, Fusarium, Hormodendrum, Mucor, Rhizopus, especially, R. nigricans, Neurospora, Nigroospora or Penicillium; 17α-hydroxylating species of the genera Tricothecium, especially Tricothecium roseum, Cladosporium, Leptosphaeria or Trichodema; 21-hydroxylating species of the Wojnowicia, especially, W. graminis, Ophiobolus, especially, O. herpotrichus or Hendersonia.

The combination of organisms may be composed of any of the above named 1-dehydrogenating species of Athrobacter and one or more of the group of hydroxylators. The special advantage of the invention is derived from the fact that organisms properly selected, by interacting, perform better together than separately. The advantage is shown most strikingly in the combination of Arthrobacter simplex and Streptomyces roseochromogenes.

The inoculum for the mixed culture fermentation may be prepared by cultivating the given organism on media best adapted for growth of that particular organism. An agar slant culture may be used to provide surface growth to inoculate a shaken flask for further propagation of the microorganism according to the conventional techniques. Growth from the first or later member of a series of shaken flasks may then be used in the mixed culture fermentation.

Thus, for example, the composition of an agar medium suitable for the cultivation of bacteria such as A. simplex is as follows:

MEDIUM A

| | G. |
|---|---|
| Beef extract (Difco) | 1.5 |
| Yeast extract (Difco) | 3.0 |
| Peptone (Difco) | 6.0 |
| Dextrose | 1.0 |

Distilled water q.s. 1 liter
Autoclave 20 minutes at 121° C.

Another agar medium adapted especially to the growth of actinomycetes such as *S. roseochromogenes* is:

MEDIUM B

| | G. |
|---|---|
| Agar (Difco) | 20.0 |
| Glucose | 10.0 |
| Yeast extract (Difco) | 2.5 |
| Potassium phosphate (dibasic) | 1.0 |

Distilled water, 1 liter.
Autoclave at 121° for 20 minutes.

A medium which may be used in the initial shaken flask stages when cultures of bacteria and actinomycetes are to be grown may be made as follows:

MEDIUM C

| | G. |
|---|---|
| Extracted soybean meal (Archer-Daniels-Midland) | 15.0 |
| Soybean oil | 2.2 |
| Glucose monohydrate | 11.0 |
| Calcium carbonate (technical) | 2.5 |

Tap water q.s. 1.0 liter.

The mixed culture fermentation of this invention is carried out in a liquid culture medium containing conventional sources of carbohydrate, nitrogenous substances, inorganic salts and growth factors. The sources of carbohydrates include, for example, soybean meals, glucose, saccharose, molasses and the like. Nitrogenous substances include, for example, amino acids, casein hydrolysates, cereal grain meals, peptones, meat extracts, cornsteep liquor, and the like. Representative of the inorganic salts are magnesium sulfate, sodium acid phosphate and potassium phosphate (dibasic and monobasic). Growth factors may be added in pure form or may be obtained from yeast extract or trace impurities in the crude nitrogenous materials.

The steroid substrate to be converted may be added to the fermentation medium as a solution or suspension in water. Preferably a small amount of surface active agent such as Tween 80 is included in the solution or suspension. The amount of steroid substrate introduced into the fermentation medium may vary within rather broad limits but preferably it is in a proportion of about 0.2 to 2 grams/liter.

Illustrative of the composition of the medium for mixed culture fermentation and one that is preferred for mixed culture fermentations with bacteria and actinomycetes is the following:

MEDIUM D

| | G. |
|---|---|
| Extracted soybean meal (ADM) | 20.0 |
| Glucose monohydrate | 33.0 |
| Calcium carbonate (technical) | 7.5 |
| Soybean oil | 2.2 |
| Potassium phosphate (dibasic) | 1.0 |
| Potassium phosphate (monobasic) | 1.0 |

Tap water q.s. 1 liter.
Autoclave at 121° C. for 30 minutes.

A medium well suited for cultivation of fungi such as *C. lunata* or *A. coerulea*, as well as for *A. simplex*, when mixed cultures of these are intended, is as follows:

MEDIUM E

| | G. |
|---|---|
| Glucose | 30.0 |
| Soybean meal (staley's 4s) | 20.0 |
| Soybean oil | 2.2 |
| $CaCO_3$ | 2.5 |

Distilled water q.s. 1 liter.
Autoclave at 121° for 30 minutes.

A medium preferred for the final stage in mixed culture fermentations of fungi and bacteria is:

MEDIUM F

| | G. |
|---|---|
| Cornsteep liquor solids | 3.0 |
| $(NH_4)H_2PO_4$ | 3.0 |
| Yeast extract (Difco) | 2.5 |
| Glucose | 10.0 |

Adjust to pH 1.0
Distilled water qs. 1 liter.
Autoclave at 121° C. for 30 minutes.

About 1 to 20%, preferably about 5% (vol./vol.) of inoculum of each of the 1-dehydrogenating species is used to inoculate the fermentation medium. The inoculation is best effected as nearly simultaneously as possible although some interval between inoculation with the microorganisms is not deleterious in some cases so long as interaction between them occurs. For best results, the steroid too should be added substantially simultaneously. It is also possible to introduce a portion of the steroid simultaneously with the microorganisms and then additional increments of the steroid as the reaction progresses.

After the two cultures and the steroid have been added to the medium, incubation is carried out under aerobic conditions (e.g., about 0.5–1.0 vol./vol./min.), preferably with agitation (e.g., about 400–600 r.p.m.). The fermentation may be carried out at a temperature within the range of about 15 to 45° C., preferably about 25° C.

The dehydration and hydroxylation are generally complete within a period of about 20 to 200 hours. Usually about 72 hours are sufficient.

The product is separated from the fermentation medium by the conventional means of filtering off the solids and recovering the product from the filtrate by solvent extraction, selective precipitation or the like. Alternatively, whole broth may be contacted with a miscible or immiscible solvent prior to removal of solids by filtration or centrifugation. Solids obtained by centrifugation or filtration, before or after contact with solvent, may be extracted further with acetone, methyl-isobutyl-ketone, or the like.

This method may be used to produce, for example, corticosteroids such as predisolone, triamcinolone, dexamethasone, 6α - fluorodexamethasone, 6α - fluorotriamcinolone, 6α - fluorotriamcinolone acetonide, 6α - methylprednisolone, and the like, as well as intermediates such as 16α - hydroxyprednisolone, 16α - hydroxyprednisolone-16,17 - acetonide, 1 - dehydro - 11α,16α-dihydroxycortexolone, 16α - hydroxyprednisolone, 1 - dehydro - 16-dehydro 11α - hydrocortexone, 1 - dehydro - 11α,16α-dihydroxycortexolone - 16,17 - acetonide, 16α - hydroxyprednisolone - 16,17 - acetonide, 6α - fluoro-16α-methylprednisolone, and 6α - fluoro - 16α - methylprednisolone-16, 17-acetonide, which may be ultimately converted into such compounds.

Illustrative of the steroids which are saturated in the 1,2-position and have a replaceable hydrogen in the 11, 16,17 or 21-position and which may be subjected to dehydrogenation and hydroxylation by the process of this invention are the following: 9α - fluorohydrocortisone and 21-esters thereof such as 9α - fluorohydrocortisone - 21-acetone, 9α - fluorohydrocortisone - 21 - hemisuccinate and the like, cortexolone, 16α - hydroxycortexolone, 16α-hydroxycortexolone - 16,17 - acetonide and 21-esters thereof such as the acetate, hydrocortisone and 20-esters thereof such as hydrocortisone - 21 - acetate, 6α - fluoro-16α-hydroxycortexolone - 16,17 - acetonide, 6α - fluoro-16α-methylcortexolone, 6α - methylcortexolone, 16 - dehydrocortexone, and 21-esters thereof such as acetate.

The mixed culture fermentation process of this invention, involving the use of a 1-dehydrogenating species of the genus Arthrobacter and at least one hydroxylating organism simultaneously with the interaction of cultures and their enzymes during growth and enzyme formation in the presence of steroid, occurs in such a way that undesirable transformations are avoided and desirable enzymatic activities are enhanced. The resultant one-step conversion offers advantages over multistep processes not only in economy of material and time but also in the reduction of losses occurring in sequential recovery procedures.

The following examples are illustrative of the invention.

EXAMPLE 1

Surface growth from a 5–7 day old agar slant culture of *Arthrobacter simplex* ATTC No. 6946 grown on Medium A above is used to inoculate 50 ml. of Medium C above contained in a 250 ml. Erlenmeyer flask. The inoculated flask is placed for incubation at 25° C., and agitated at 280 r.p.m. in a circle of diameter 2 inches on a shaking machine. After 48 hours a 10% (vol./vol.) transfer is made to another 250 ml. flask containing 50 ml. of Medium C. The second flask, after inoculation, is incubated under the same conditions as the first.

Proceeding on the same schedule as with the first culture, surface growth from a 5 day old agar slant culture grown on Medium B above of *Streptomyces roseochromogenes* ATCC No. 13,400 is transferred to 50 ml. of Medium C. contained in a 250 ml. Erlenmeyer flask. The flask medium is the same as that used for propagation of *A. simplex* in the first two flask stages.

The first shaken flask culture of *S. roseochromogenes*, inoculated as indicated, is incubated for 48 hours under conditions identical to those used for propagation of *A. simplex*. A second flask stage is inoculated by 10% (vol./vol.) transfer, and incubation of the second flask is carried out as the first, for 48 hours. Thus, inoculum of the two cultures is ready for use at the same time.

Both cultures are used to inoculate 50 ml. portions of Medium D above. 5% (vol./vol.) inoculum of each species is used, and the inoculation is as nearly simultaneous as possible. Also at the same time a suspension of 9α-fluorohydrocortisone is added in aqueous suspension to provide 300 μg. of steroid/ml. of mixed culture broth. The suspension of steroid is prepared by adding finely powdered steroid to 0.01% aqueous Tween 80 to give 30 mg./ml., and autoclaving for 15 minutes at 121° C.

After the two cultures and steroid suspension are added to the fermentation medium, incubation is carried out under the same conditions as those described for preparation of inoculum. Samples are taken at intervals, extracted with methyl isobutyl ketone, and the extracts are subjected to paper chromatography on Whatman No. 1 paper with a benzene-ethanol-water solvent system. Steroids containing the α,β-unsaturated ketone function are detected by an ultraviolet scanning device, and the dihydroxyacetone side chain is detected by a blue tetrazolium reagent. In 71 hours the conversion of 9α-fluorohydrocortisone to triamcinolone is complete. No evidence for reduction of the 20-keto group is seen. The steroid is isolated from the broth by the filtering off the mycelium, extracting the filtrate with isobutyl acetate and concentrating the solvent to dryness, and crystallizing the residue from an acetone-hexane solvent system.

EXAMPLE 2

Vegetative inoculum of the two species, *A. simplex* and *S. roseochromogenes*, is prepared as described in Example 1, except that in the second flask stage, 100 ml. of medium C is contained in a 500 ml. Erlenmeyer flask. Inocula so prepared are used to inoculate four liters of Medium D, prepared and sterilized in a 7.5 liter glass fermentor. To the inoculated fermentation broth is added, as soon as possible after inoculation, 2.0 g. of 9α-fluorohydrocortisone suspended in 80 ml. of aqueous 0.01% Tween 80 solution. Incubation temperature (25°) is maintained by submerging the fermentor partially in a tempered water bath. Agitation is 400–600 r.p.m.; aeration is 4 liters/min. at room temperature.

After 89 hours the conversion of 9α-fluorohydrocortisone to triamcinolone is complete. Quantitative analysis of paper chromatograms shows that the conversion is equal to or better than 90%. The triamcinolone is isolated as in Example 1.

EXAMPLE 3

The two cultures, *A. simplex* and *S. roseochromogenes*, are propagated as in Example 1, except that in the second shaken flask stage, 1000 ml. of Medium C is contained in a 4-liter flask equipped with a sidearm transfer tube and inoculating bell. For the fermentation stage, 30 liters of Medium D are prepared and sterilized in a 40-liter stainless steel fermentor provided with a jacket for temperature control by means of tempered water, an agitation system, and an aeration system. Immediately after both of the cultures (each 5% vol./vol.) are inoculated into the fermentor, 9.37 g. of 9α-fluorohydrocortisone suspended in 300 ml. of 0.01% aqueous Tween 80 solution is added. Fermentation is carried out at 25° C. with agitation at 220–350 r.p.m. and aeration at 0.5–1.0 (vol./vol./min.). Periodic analysis by the paper chromatographic method shows the conversion to triamcinolone to be complete in 81 hours.

The broth is filtered with 5 kg. of Hyflo as filter aid through a Lapp funnel. The mycelial cake is washed on the funnel with about 5 liters of water. Combined filtrate and wash, a total of 41.7 liters, is extracted with a total of 134 liters of methyl isobutyl ketone used in four equal parts in successive extractions. Concentration of the extract to virtual dryness gives 6.02 g. of crude steroid containing 77.8% of triamcinolone. Pure triamcinolone is obtained by recrystallization from ethanol.

EXAMPLE 4

Following the procedure of Example 1, triamcinolone is produced from 9α-fluorohydrocortisone-21-acetate using *S. roseochromogenes* and *A. Simplex*.

EXAMPLE 5

Triamcinolone is produced from 9α-fluorohydrocortisone-21-hemisuccinate following the procedure of Example 1 using *S. roseochromogenes* and *A. simplex*.

EXAMPLE 6

16α-hydroxyprednisolone is produced from hydrocortisone by the procedure of Example 1 using *S. roseochromogenes* and *A. simplex*.

EXAMPLE 7

16α-hydroxyprednisolone-16,17-acetonide is produced from 16α-hydroxycortexolone-16,17-acetonide by following the procedure of Example 1 using *Curvularia lunata* ATCC No. 12017 and *A. simplex*.

One ml. of aqueous suspension of *C. lunata*, grown for two weeks at 25° C. on Medium E, is used to inoculate 50 ml. of Medium C contained in a 250 ml. Erlenmeyer flask. Incubation is carried out at 25° C. with rotary mechanical shaking (280 r.p.m., 1.0 inch radius) for 48 hours. At the same time and under the same conditions, but separately, *A. simplex* is grown as in Example 1. A second flask stage, in which Medium E (100 ml./500 ml.

flask) is employed, is used to propagate the organisms separately for 48 hours under the above conditions. Three flasks of each culture are prepared in the second stage. In the third flask stage 29–500 ml. flasks, each containing 100 ml. of Medium F, are supplemented with 1007 mg. of 16α-hydroxycortexolone-16,17-acetonide suspended in 60 ml. of Tween 80 aqueous solution (2.0 ml./flask). Incubation is for 129 hours under the conditions described above.

The contents of the flasks are pooled and filtered with suction through a Seitz clarifying filter pad. About 870 ml. of distilled water are used to rinse the flasks and wash the mycelial cake. The total volume of filtrate combined with washings is 3570 ml.

This mixture is extracted three times with 1200 ml. portions of water and evaporated under reduced pressure. The residue (1.4 g.) is crystallized from acetone-hexane to give 424 mg. of 16α-hydroxyprednisolone-16,17-acetonide. By thin layer chromatography of the mother liquor using silica gel $HF_{254}$ as adsorbent and ethyl acetate chloroform (1:1, v.:v.) as the developing solvent two bands are detectable by U.V. light as $R_f$ 0.2 and 0.5 respectively. By elution of the more polar band and crystallization an additional 64 mg. of 16α-hydroxyprediseolone 16,17-acetonide is obtained. From the less polar band on elution and crystallization there is obtained 147 mg. of 16α-hydroxy-1-dehydrocortexolone-16,17-acetonide.

EXAMPLE 8

1-dehydro-11α,16α-dihydroxycortexolone is produced from 16α-hydroxycortexolone by the procedure of Example 7 using *Aspergillus ochraceus* ATCC No. 12337 and *A. globiformis* ATCC No. 8010. The product is an intermediate in the production of triamcinolone.

EXAMPLE 9

16α-hydroxyprednisolone, an intermediate in the production of triamcinolone, is produced from 16α-hydroxycortexolone by the procedure of Example 8 using *Curvularia lunata* ATCC No. 12017 and *A. oxydans*, ATCC No. 14349.

EXAMPLE 10

1-dehydro-16-dehydro-11α-hydroxycortexone, an intermediate in the production of triamcinolone, is produced from 16-dehydrocortexone-21-acetate by the procedure of Example 8 using *Aspergillus ochraceous* and *A. ureafaciens* ATCC No. 7562.

EXAMPLE 11

A mixture of 1-dehydro-11α,16α-dihydroxycortexolone-16,17-acetonide and 16α-hydroxyprednisolone-16,17-acetonide, intermediates in the production of triamcinolone, is produced from 16α-hydroxycortexolone-16,17-acetonide-21-acetate by the procedure of Example 9 using *Absidia Coreulea* ATCC No. 14076 and *A. simplex*.

One ml. of a suspension of surface growth from a 2-week old agar slant culture of *A. coerulea* on Medium B is used to inoculate 50 ml. of Medium C contained in a 250 ml. Erlenmeyer flask. The inoculated flask is incubated on the rotary shaker (280 cycles/min., 1.0 inch radius) for 48 hours at 25° C. Simultaneously but separately, *A. simplex* is cultured as in Example 1. Six flasks of Medium E (100 ml./500 ml. flask) are inoculated (three with each culture) in the second pure culture growth stage, incubated as in the first. The third flask stage, in which the cultures are mixed is made up of 30–500 ml. flasks, each containing 100 ml. of Medium F and approximately 35 mg. of 16α-hydroxycortexolone-16,17-acetonide. The steroid is added in suspension in aqueous Tween 80 solution, approximately 2.0 ml./flask, before the flasks are inoculated. A total of 1059 mg. of steroid is added.

The mixed culture fermentation is carried out for 95 hours, the contents of the flasks are pooled, washed with water, filtered with suction on a Seitz clarifying pad, and a total of 3520 ml. of filtrate and washings are collected.

The residual mycelial cake is washed with 900 ml. of acetone which are collected and kept separate from the aqueous filtrate and washings.

The aqueous filtrate and washings are extracted three times with 1200 ml. portions of chloroform. The combined chloroform extracts are washed twice with 2000 ml. portions of water and concentrated under reduced pressure. The residue (1.01 g.) is crystallized from acetone-hexane to give 430 mg. of 16α-hydroxyprednisolone-16,17-acetonide.

By thin layer chromatography of the mother liquors on silica gel $HF_{254}$ using ethyl acetate-chloroform (1:1, v.:v.) as the developing solvent two bands are detectable by UV light at $R_f$ 0.2 and 0.3 respectively. Elution of the more polar band and crystallization of the residue from acetone-hexane gives 25 mg. of 11α,16α-dihydroxy-1-dehydrocortexolone-16,17-acetonide. From the less polar band on elution and crystallization there are obtained an additional 89 mg. of 16α-hydroxyprednisolone-16,17-acetonide.

Concentration of the acetone washings of the mycelial cake followed by distribution between chloroform and water and evaporation of the chloroform extract gives 161 mg. of residue from which on crystallization by acetone-hexane 50.8 mg. of 16α-hydroxycortexolone-16,17-acetonide are obtained.

EXAMPLE 12

6α-fluoro-16α-hydroxyprednisolone - 16,17 - acetonide, an intermediate in the production of 6α-fluorotriamcinolone-16,17-acetonide, is produced from 6α-fluoro-16α-hydroxycortexolone-16,17-acetonide by the procedure of Example 8 using *Cunninghamella blakesleeana* ATCC No. 8688a and *A. tumescens* ATCC No. 6947.

EXAMPLE 13

6α-fluoro-16α-methylprednisolone, an intermediate in the production of 6α-fluorodexamethasone, is produced from 6α-fluoro-16α-methylcortexolone by the procedure of Example 8 using *Cunninghamella blakesleeana* and *A. terregens* ATCC No. 13345.

EXAMPLE 14

1-dehydro-17α-hydroxyprogesterone is produced from progesterone by the procedure of Example 7 using *A. simplex* and *Tricothecium roseum*.

EXAMPLE 15

1-dehydrodesoxycorticosterone is produced from progesterone by the procedure of Example 7 using *A. simplex* and *Wojnowicia graminis*.

What is claimed is:

1. A process for 1-dehydrogenating and 16-hydroxylating a seroid which is saturated in the 1,2-position and which has a replaceable hydrogen atom in the 16-position which comprises subjecting said steroid simultaneously to the fermentative action of a 1-dehydrogenating bacterium of the genus Arthrobacter and to the fermentative action of a hydroxylating microorganism of the genus Streptomyces in a mixed culture fermentation by adding said steroid and microorganisms or enzymes thereof substantially simultaneously to a medium containing an assimilable source of carbohydrate, nitrogenous substances, inorganic salts and growth factors, permitting said fermentative actions to take place and recovering the hydroxylated 1-dehydro steroid therefrom.

2. A process as in claim 1 wherein the 1-dehydrogenator is *Arthrobacter simplex* and the hydroxylator is *Streptomyces roseochromogenes*.

3. A process as in claim 2 wherein the starting steroid is 9α-fluorohydrocortisone.

References Cited

UNITED STATES PATENTS

| 2,831,798 | 4/1958 | McAleer et al. | 195—51 |
|---|---|---|---|
| 2,844,513 | 7/1958 | Wettstein et al. | |
| 2,969,305 | 1/1961 | Wettstein et al. | |
| 3,079,384 | 2/1963 | Diassi et al. | |
| 3,183,150 | 5/1965 | Werder et al. | |

OTHER REFERENCES

Charney et al., Microbial Transformations of Steroids, pp. 269 and 684, Academic Press, New York, 1967.

Heftmann et al., Biochemistry of Steroids, p. 116, Reinhold Publishing Corp., New York, 1960.

ALVIN E. TANENHOLTZ, Primary Examiner

U.S. Cl. X.R.

195—100, 111